United States Patent
Gaboury et al.

[19]

[11] Patent Number: 6,021,162
[45] Date of Patent: Feb. 1, 2000

[54] VORTEX SERIAL COMMUNICATIONS

[75] Inventors: Michael Gaboury, Burnsville; Xiaoxin Feng, Eden Prairie, both of Minn.

[73] Assignee: Rosemount Inc., Eden Prairie, Minn.

[21] Appl. No.: 08/941,949

[22] Filed: Oct. 1, 1997

[51] Int. Cl.[7] .................................................. H04B 14/04
[52] U.S. Cl. ........................................ 375/242; 702/176
[58] Field of Search .................................. 375/242, 240, 375/241, 238; 702/57, 176

[56] References Cited

U.S. PATENT DOCUMENTS

| | | | |
|---|---|---|---|
| 3,760,412 | 9/1973 | Barnes . | |
| 3,852,809 | 12/1974 | Coker, Jr. | 360/40 |
| 3,905,029 | 9/1975 | McIntosh . | |
| 3,909,629 | 9/1975 | Marino . | |
| 4,007,331 | 2/1977 | Flanagan | 375/330 |
| 4,032,915 | 6/1977 | Shanks et al. . | |
| 4,053,834 | 10/1977 | Lerner | 455/43 |
| 4,100,531 | 7/1978 | Kobayashi et al. | 375/225 |
| 4,312,070 | 1/1982 | Coombes et al. . | |
| 4,400,688 | 8/1983 | Johnston et al. | 340/310.02 |
| 4,425,645 | 1/1984 | Weaver et al. . | |
| 4,485,448 | 11/1984 | Kurth . | |
| 4,501,000 | 2/1985 | Immink et al. | 375/242 |
| 4,529,941 | 7/1985 | Lipoff | 329/303 |
| 4,574,247 | 3/1986 | Jacob | 329/300 |
| 4,592,072 | 5/1986 | Stewart | 375/282 |
| 4,787,096 | 11/1988 | Wong | 375/376 |
| 4,951,049 | 8/1990 | Whitfield | 341/64 |
| 4,954,825 | 9/1990 | Chi | 341/64 |
| 5,042,053 | 8/1991 | Hoppes | 375/354 |
| 5,073,905 | 12/1991 | Dapper et al. | 375/354 |
| 5,081,644 | 1/1992 | Uchida et al. | 375/200 |
| 5,148,452 | 9/1992 | Kennedy et al. | 375/343 |
| 5,170,396 | 12/1992 | Rivers et al. | 714/709 |
| 5,175,557 | 12/1992 | King et al. | 342/357.12 |
| 5,315,299 | 5/1994 | Matsumoto | 341/53 |
| 5,357,196 | 10/1994 | Ito | 324/166 |
| 5,374,927 | 12/1994 | MacTaggart et al. | 341/53 |
| 5,574,396 | 11/1996 | Drainville | 327/337 |
| 5,798,711 | 8/1998 | Issa et al. | 340/825.31 |

FOREIGN PATENT DOCUMENTS

| | | |
|---|---|---|
| 0 237 238 | 9/1987 | European Pat. Off. . |
| 0 377 335 A2 | 7/1990 | European Pat. Off. . |
| 3131 845 A1 | 2/1983 | Germany . |
| 52-14343 | 3/1977 | Japan . |
| 5-227035 | 3/1993 | Japan . |
| WO 94/15426 | 7/1994 | WIPO . |

OTHER PUBLICATIONS

R.E. Ziemer and W.H. Tranter, Principles of Communications–Systems, Modulation and Noise, Second Edition, 1985, pp. 360–362.

M. Banu and A.E. Dunlop, "Clock Recovery Circuits with Instantaneous Locking", *Electronics Letters*, vol. 28, No. 23, Nov. 5, 1992, pp. 2127–2130.

*Primary Examiner*—Stephen Chin
*Assistant Examiner*—Lenny Jiang
*Attorney, Agent, or Firm*—Westman, Champlin & Kelly, P.A.

[57] ABSTRACT

A method of and apparatus for decoding an encoded signal are disclosed. A first bit of the encoded signal is received and integrated with a super linear integrator to provide a first integration signal. A first reference signal is provided as a function of a previous integration signal associated with a previous bit of the encoded signal by multiplying the previous integration signal by an amount greater than one if the previous bit has a first value, and by multiplying the previous integration signal by an amount less than one if the previous bit has a second value. The first integration signal is compared to the first reference signal and a first bit of an output signal is provided based upon the comparison. The first bit of the output signal is indicative of information encoded in the first bit of the encoded signal.

21 Claims, 7 Drawing Sheets

VORTEX SERIAL COMMUNICATIONS

INCORPORATION BY REFERENCE

Reference is made to co-pending U.S. patent application Ser. No. 08/719,843 entitled DATA BUS COMMUNICATION TECHNIQUE FOR FIELD INSTRUMENT, and owned by the same assignee as the present invention.

BACKGROUND OF THE INVENTION

The present invention relates generally to the field of process control instruments. More particularly, the present invention relates to systems and methods for facilitating serial communication within a process control instrument.

Transmitters in the process control industry typically communicate with a controller over a two-wire circuit or control loop. The transmitter receives commands from a controller over the two-wire control loop and sends output signals representative of a sensed physical parameter back to the controller. The transmitter itself can include a number of devices such as microprocessors, memory devices, analog-to-digital convertors, digital-to-analog convertors, digital signal processors (DSPs), sensors, and other peripheral devices. Communication between the various devices inside of the transmitter typically takes place on a data bus which includes a clock line and a number of data lines. Because of concerns about current consumption and complexity, it is important to minimize the number of data bus lines required for communication between the various devices.

In many process control instruments, the sensor of the process control instrument must be electrically isolated from measurement circuitry or other devices in the process control instrument for safety purposes. An isolation barrier is used to electrically isolate the sensor from the rest of the circuitry within the transmitter. The sensor receives power and communicates with the measurement circuitry through the barrier. The barrier prevents harmful electrical discharges, sometimes present on the process control loop, from entering the measurement circuitry. While necessary for safety or other purposes, inclusion of the isolation barrier reduces the number of electrical connections allowed between the sensor and the other devices for communication, clock information and power. Conventional serial communications techniques used to transmit data across the isolation barrier frequently result in undesirably high levels of power consumption and/or complex circuitry.

SUMMARY OF THE INVENTION

A method of and apparatus for decoding an encoded signal are disclosed. A first bit of the encoded signal is received and integrated with a super linear integrator to provide a first integration signal. A first reference signal is provided as a function of a previous integration signal associated with a previous bit of the encoded signal by multiplying the previous integration signal by an amount greater than one if the previous bit has a first value, and by multiplying the previous integration signal by an amount less than one if the previous bit has a second value. The first integration signal is compared to the first reference signal and a first bit of an output signal is provided based upon the comparison. The first bit of the output signal is indicative of information encoded in the first bit of the encoded signal.

The method and apparatus of the present invention are particularly adapted for communicating serially across a barrier in a process control instrument. A housing for the process control instrument has a first compartment, a second compartment, and an electrical barrier between the first and second compartments. Encoding circuitry in the first compartment is coupled to the barrier for encoding data in a signal for transmission across the barrier. Cycles of the signal having a first period are representative of a first data state, while cycles of the signal having a second period are representative of a second data state. Decoding circuitry in the second compartment is coupled to the barrier and receives and decodes the signal having the varying period. In some preferred embodiments, the encoded signal has a fifty percent duty cycle to reduce power consumption by the barrier and to improve the quality of the transmitted signal. The decoding circuitry of the present invention can be used to decode either frequency modulated signals or pulse width modulated signals.

DETAILED DESCRIPTION OF THE PREFERRED EMBODIMENTS

Figure 1:
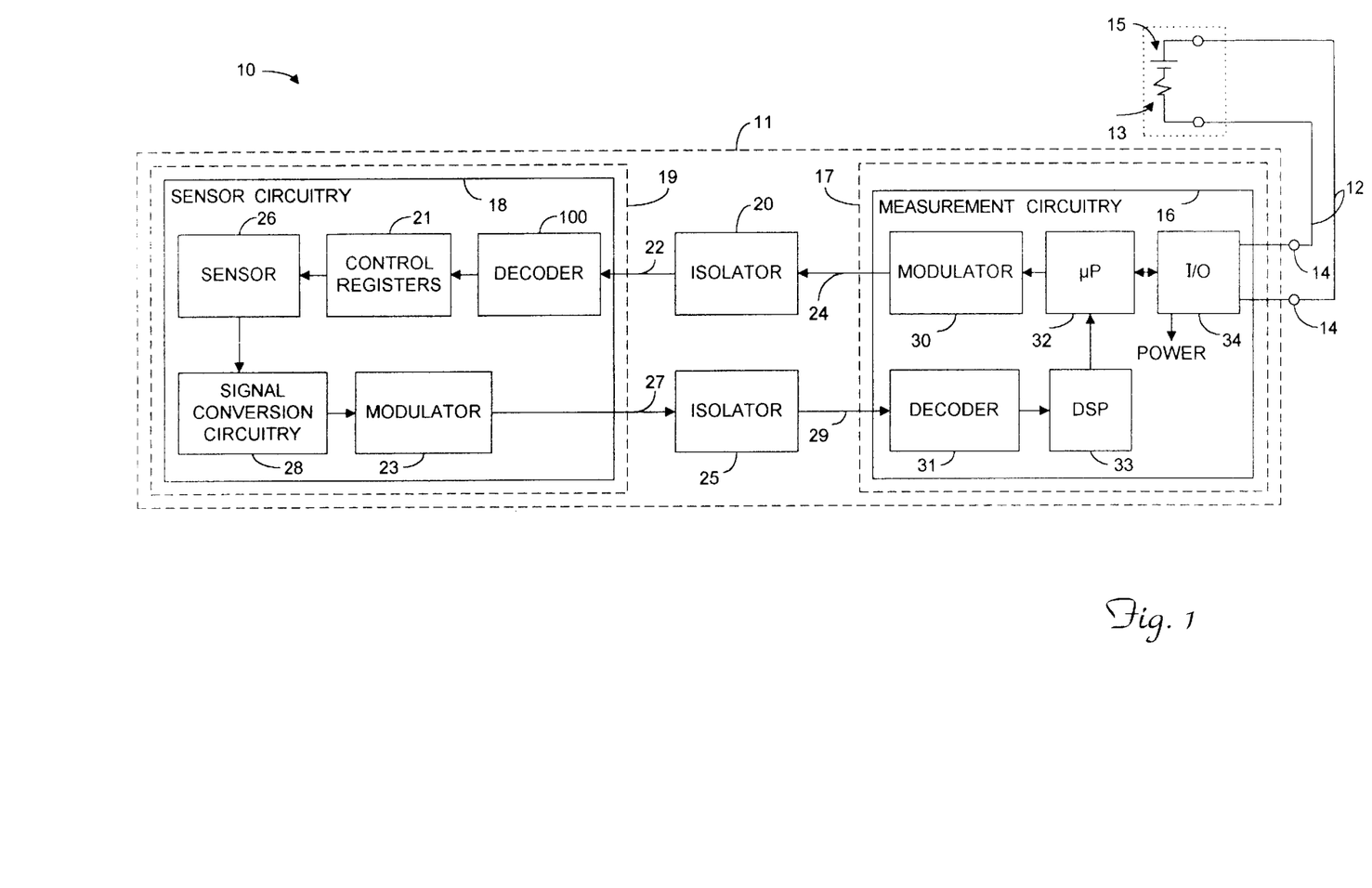
FIG. 1 is a simplified block diagram of one type of a process control transmitter using communications techniques and circuits of the present invention.

FIG. 1 is a simplified block diagram of a transmitter 10 which uses the serial communications techniques of the present invention for communicating between various devices within or associated with the transmitter. As illustrated, transmitter 10 includes housing 11, measurement circuitry 16 and sensor circuitry 18. Measurement circuitry 16 is positioned in compartment 17 of housing 11. Sensor circuitry 18 is positioned in compartment 19 of housing 11. Portions of sensor circuitry 18 can also be located externally from housing 11 as well.

Measurement circuitry 16 couples to two-wire loop 12 via connection terminals 14 and is used for sending and receiving information on loop 12. Loop 12 couples to a control room which is modeled as power source 15 and resistor 13. Measurement circuitry 16 and/or sensor circuitry 18 can include multiple nodes of two types: master nodes which are typically microprocessors or slave nodes which are typically peripheral devices such as memory. Other examples of peripheral devices which can be included within measurement circuitry 16 or sensor circuitry 18 are devices for extracting power for the transmitter from current flowing through loop 12, modems and other communications and I/O devices, signal processing devices, display devices, analog-to-digital convertors, digital-to-analog convertors, temperature sensors, flow sensors, pH sensors, level sensors, pressure sensors, differential pressure sensors, etc.

As mentioned above, in one embodiment, measurement circuitry 16 and sensor circuitry 18 are located in separate compartments 17 and 19 within transmitter 10 and are electrically isolated by isolators 20 and 25. The isolators can be transformers, optical barriers, or other isolation barriers known in the art and required for electrically isolating sensor circuitry 18 and the process from measurement circuitry 16. The isolators can also reduce ground loop noise in the measurement of the parameters sensed by sensor circuitry 18. Transmission lines 22 and 24 couple measurement circuitry 16 and sensor circuitry 18 to isolator 20 for facilitating communication between sensor circuitry 18 and measurement circuitry 16 across isolator 20. In the embodiment shown, lines 22 and 24 represent a single data line across which information must be transmitted serially from measurement circuitry 16, through isolator 20, to sensor circuitry 18. Likewise, information is transmitted serially from sensor circuitry 18, through isolator 25, to measurement circuitry 16.

As illustrated, measurement circuitry 16 includes frequency modulator or encoder circuit 30, decoder circuit 31, microprocessor 32, digital signal processing circuit 33 and input/output (I/O) circuitry 34. I/O circuitry 34 is coupled to microprocessor 32 and to loop 12 for receiving data and instructions over loop 12, for transmitting data over the loop, and for regulating power from the loop to transmitter 10. Microprocessor 32 is coupled to I/O circuitry 34, to modulator 30 and to decoder 31 via DSP circuit 33 for receiving, transmitting and processing signals and data from/to the various devices of transmitter 10. In general, microprocessor 32 is used to control the operation of transmitter 10. Modulator 30 frequency modulates signals to be transmitted across transmission line 24, isolator 20 and transmission line 22 to sensor circuitry 18. Decoder 31 receives modulated signals transmitted across transmission line 27, isolator 25 and transmission line 29 from sensor circuitry 18.

Sensor circuitry 18 includes control registers 21, modulator or encoder circuit 23, sensor 26, signal conversion circuitry 28, and decoder 100. Sensor 26 senses a process variable and provides an output to signal conversion 28. Circuitry 28 can include sigma-delta modulators, complete A/D converters, or other signal conversion circuitry. Modulator 23 can be of the type like modulator 30 which frequency modulates process variable related signals to be transmitted across transmission line 27, isolator 25 and transmission line 29 to measurement circuitry 16. However, other modulation techniques can be used to transmit signals across isolator 25.

Decoder 100 decodes the frequency modulated signal transmitted across the isolation barrier from modulator 30 according to the present invention. The signal transmitted across isolator 20 carries encoded information and is used to create a clock signal for use in the operation of sensor circuitry 18. The decoded signal is provided to other circuitry within sensor circuitry 18, for example control registers 21, and can be used to control the various devices within sensor circuitry 18. Control registers 21 control test functions, filter functions, and the like. While in other embodiments measurement circuitry 16 and sensor circuitry 18 can include devices other than those illustrated in FIG. 1, in some embodiments, modulators 23 and 30 and decoders 31 and 100 are used to transmit or pass information between measurement circuitry 16 and sensor circuitry 18.

Transmitter 10 is connected to a controller, electrically modeled as voltage source 15 and resistor 13, which can provide all the power to transmitter 10. In preferred embodiments, sensor circuitry 18 also includes rectifier circuitry for rectifying the signal transmitted across isolator 20 to provide power for sensor circuitry 18. However, sensor circuitry 18 and measurement circuitry 17 can alternatively be line powered from an external power supply, as in a magmeter.

The current in the process control loop (formed by transmitter 10, source 15 and resistor 13) is typically representative of a process variable sensed by sensor 26 in transmitter 10, or of a control signal from transmitter 10. The current ranges between 4 and 20 mA, according to the ISA 4–20 mA standard. Accordingly, transmitter 10 must operate on less than 4 mA. Transmitter 10 can also be configured to communicate digitally over the 4–20 mA current, as in the HART® protocol, or can be fully digital communications as in Fieldbus.

Figure 2:
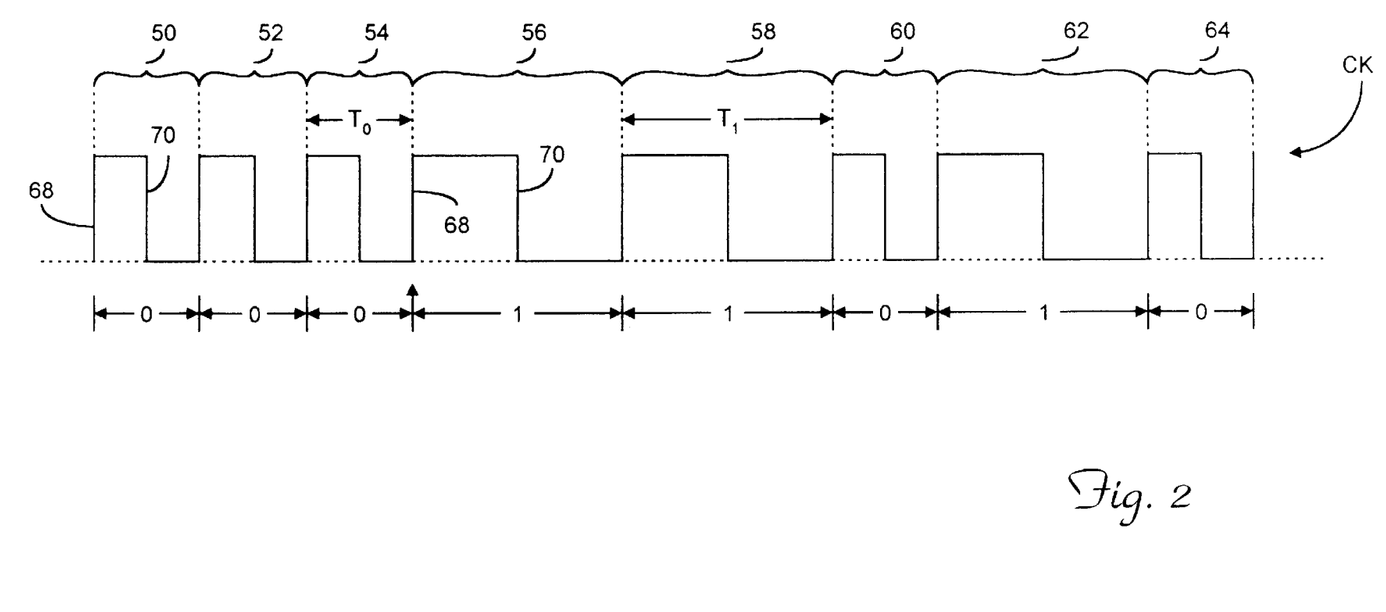
FIG. 2 is a timing diagram illustrating a coding system for serial communications in accordance with the present invention.

The present invention includes a method and apparatus for providing serial communication across isolation circuits such as isolators 20 and 25 shown in FIG. 1. For ease of illustration, only encoding and decoding of signals transmitted across isolator 20 is discussed. However, the same techniques and features can be used to encode and decode signals transmitted across isolator 25 as well. According to preferred embodiments of the present invention, a serial data stream is encoded by modulator 30 using a frequency or period modulation technique. A logical "0" (first data state) is transmitted as a cycle of the signal having a first period $T_0$ and a logical "1" (second data state) is transmitted as a cycle of the signal having a second period $T_1$ different than the first period. A serial data stream encoded in this manner is illustrated in FIG. 2. It is convenient, but not necessary, to set $T_1 \approx 2T_0$ to reduce the complexity of the encoding and decoding circuitry. In one preferred embodiment, while in a high accuracy mode of operation, $T_1$ is set to approximately 1.10 $\mu$s ($F_1 \approx 900$ KHz), while $T_0$ is set to approximately 0.55 $\mu$s ($F_0 \approx 1.8$ MHz). In this embodiment, while in a lower power mode of operation, $F_1$ is set to approximately 460.5 KHz, while $F_0$ is set to approximately 921 KHz.

An encoded data stream such as illustrated in FIG. 2 is transmitted across isolation barrier 20 in accordance with the present invention, and subsequently decoded by decoder circuit 100. By varying the period of the signal to represent various data states, as opposed to varying only the duty cycle of the signal (pulse width modulation), data transmission errors across the isolation barrier are reduced. Pulse width modulation can result in saturation of the transformer core in transformer type isolation barriers. If the transformer core saturates, power is lost in the core causing the transformer to heat. The generation of unnecessary heat around electronic instruments is undesirable as it contributes to component failures, reduced component life expectancies and degradations in the electrical performance of the components. Also, wasted power is highly undesirable, particularly in process control instruments where power is supplied over the loop. Further, the saturated core of the transformer distorts the signal, leading to transmission errors.

In preferred embodiments of the present invention, the encoded signals are approximately fifty percent duty cycle signals regardless of the period of each individual cycle of the signal. Thus, the encoded signals of the present invention are potentially easier to generate than in pulse width modulation techniques. Further, the fifty percent duty cycle signals should provide more constant power consumption as compared to pulse width modulation encoded signals. Further yet, the symmetry of a fifty percent duty cycle signal should help to reduce the harmonics associated with the signal, reducing interference on nearby components.

FIG. 2 illustrates eight consecutive cycles 50, 52, 54, 56, 58, 60, 62 and 64 of an encoded signal. Each cycle represents one bit of transmitted data. Alternatively, each cycle can represent one of multiple possible data states for transmission between devices. During each cycle, rising edge (transition) 68 and trailing edge (transition) 70 are preferably timed such that the signal has approximately a fifty percent duty cycle, regardless of the period of the signal during the cycle. As shown, cycles 50, 52, 54, 60 and 64 have periods $T_0$ (at frequency $F_0$). Cycles 56, 58 and 62 of the signal have periods $T_1$ (at frequency $F_1$). Therefore, in a two data state implementation of the present invention, the data stream of FIG. 2 would represent the sequence 00011010.

Figure 3:
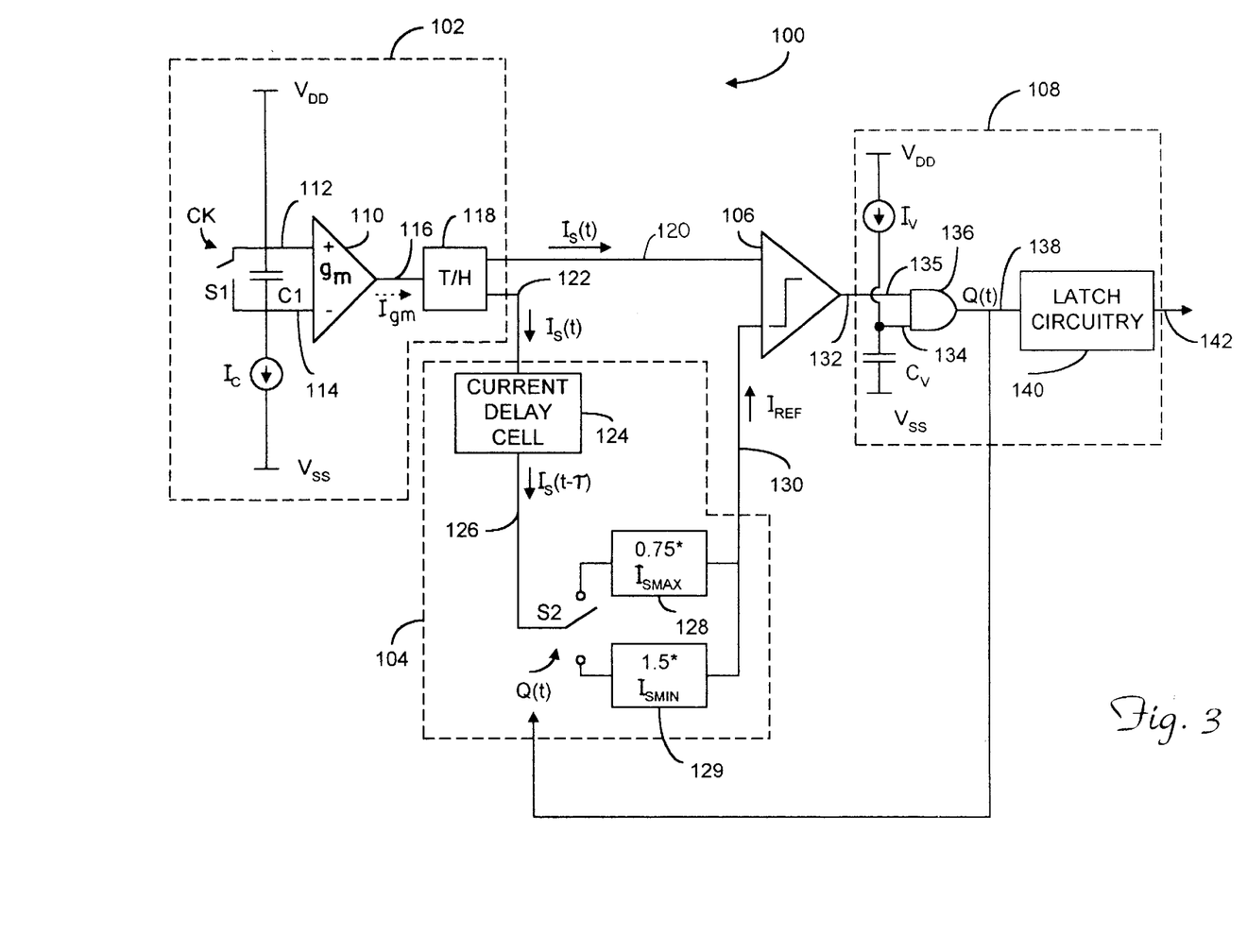
FIG. 3 is a diagram of a decoder circuit for use in decoding a serial data stream encoded in the manner illustrated in FIG. 2.
Figure 7:
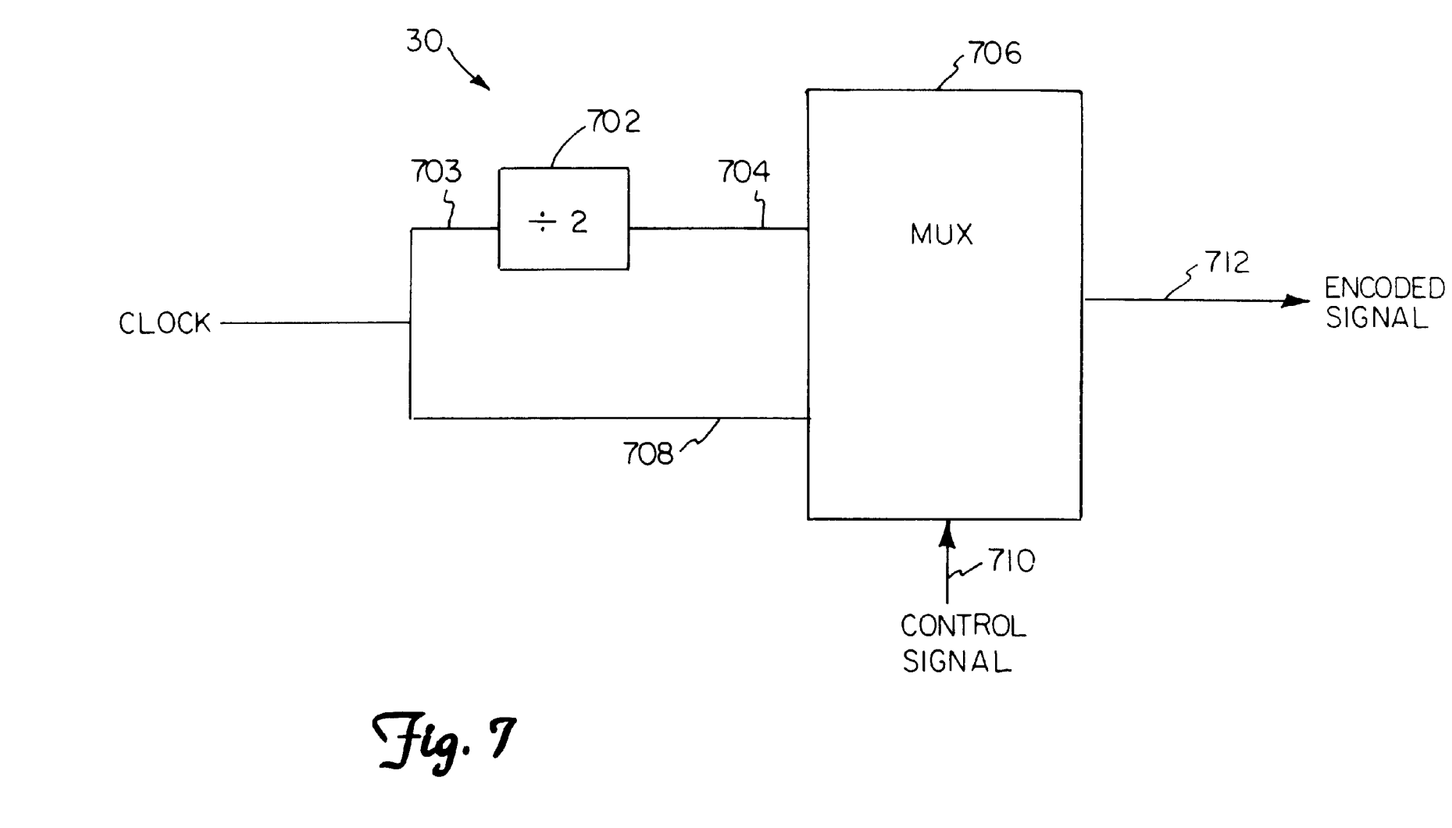
FIG. 7 is a diagram of an encoder circuit for use in encoding a serial data stream.

One circuit for decoding the period encoded data of FIG. 2 is shown in FIG. 3, although other implementations are possible. A circuit for encoding the period encoded data of FIG. 2 is shown in FIG. 7. Using serial data decoding circuit 100 illustrated in FIG. 3, a single data stream encoded using the technique of FIG. 2 and transmitted across an isolation transformer or other barrier can be decoded. Also, decoding circuit 100 can be used to decode pulse width modulated data streams as well. Thus, the circuit illustrated in FIG. 3 is well suited for use in measurement circuitry 16 and/or sensor circuitry 18 to decode data transmitted across an isolation barrier. Further, the methods and circuits of the present invention can be used to facilitate improved serial data communications on any appropriate data buses or other data lines.

Decoder circuit 100 includes current generator 102, reference current generator 104, edge triggered comparator 106 and output circuitry 108. Current generator 102 includes switch $S_1$, capacitor $C_1$, current sink $I_C$, transconductance amplifier stage 110 and track and hold circuit 118. Input 112 of transconductance amplifier 110 is coupled to supply voltage $V_{DD}$. Capacitor $C_1$ and switch $S_1$ are coupled in parallel across inputs 112 and 114 of amplifier 110. Current sink $I_C$ is coupled between input 114 of amplifier 110 and supply voltage $V_{SS}$. Output 116 of amplifier 110 provides current $I_{gm}$ as an input to track and hold circuit 118. Track and hold circuit 118 provides at outputs 120 and 122 currents $I_S(t)$ which are delayed versions of $I_{gm}$.

Switch $S_1$ is controlled using the incoming encoded data signal CK. During the high voltage portions of the CK signal duty cycle, switch $S_1$ opens. Switch $S_1$, capacitor $C_1$, current sink $I_C$ and transconductance amplifier 110 together form super linear integration circuit. The term, "super linear" is intended to indicate that the output of the integration circuit as a function of time can be represented by $y=mt^x$ (where X is greater than one). Depending upon the period or frequency of incoming signal CK controlling switch $S_1$, output current $I_{gm}$ at output 116 of amplifier 110 will have one of two period or frequency dependent final values, with each final value corresponding to one of the two data states encoded. However, in other embodiments, the circuit can be adapted to provide three or more output states corresponding to three or more possible data states.

Figure 5:
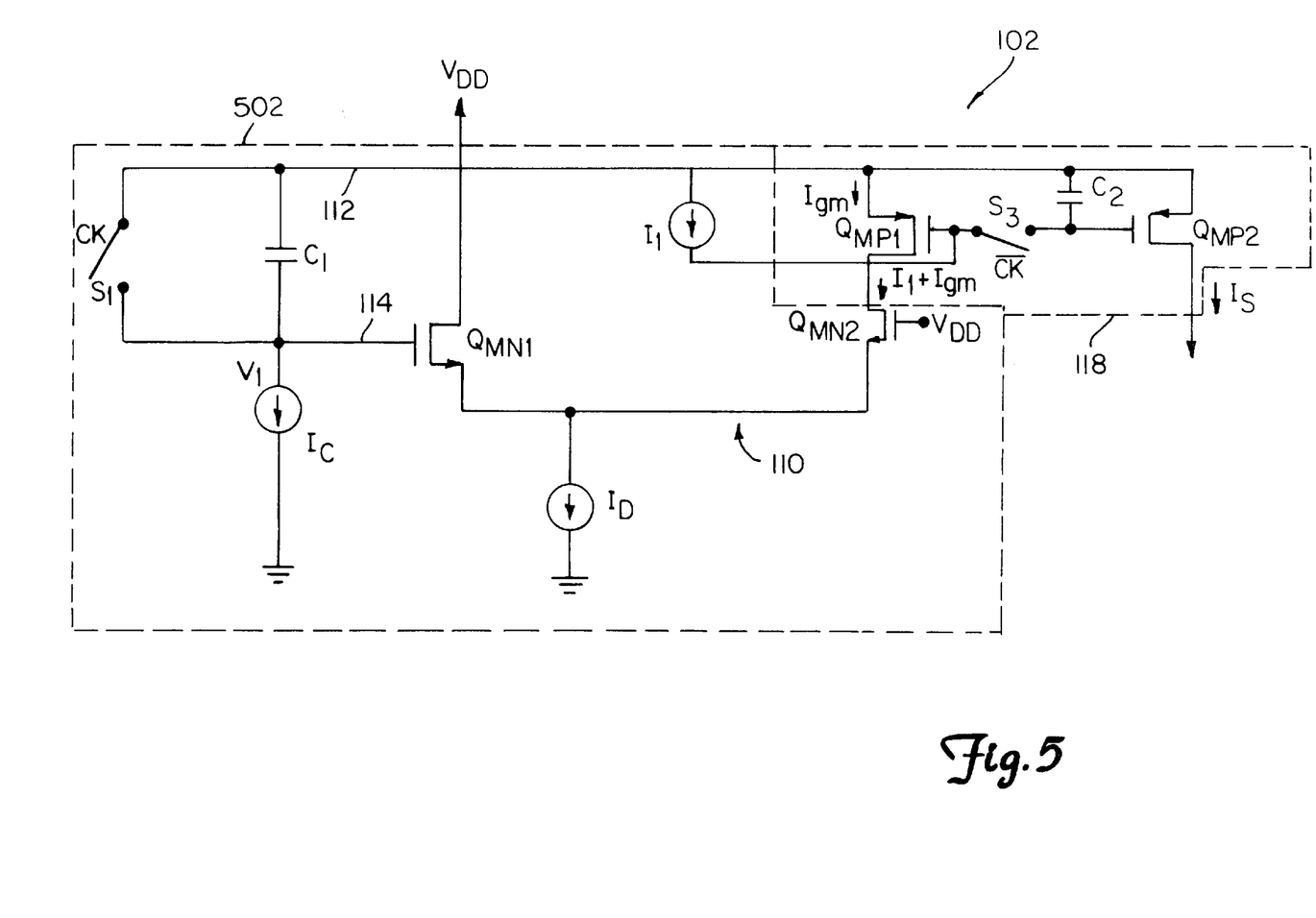
FIG. 5 is a detailed circuit diagram for the current generator of FIG. 3.
Figure 6:
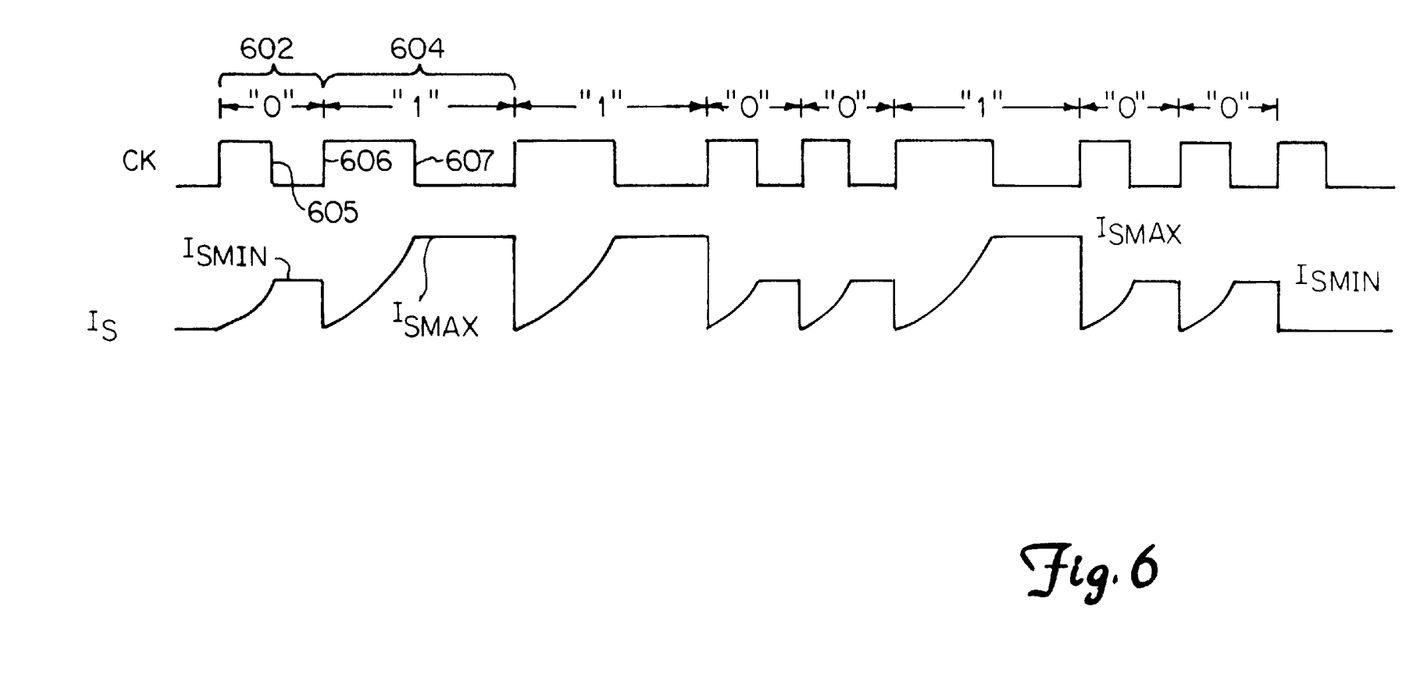
FIG. 6 is a diagram which further illustrates operation of the circuits shown in FIGS. 3 and 5 in accordance with the present invention.

Track and hold circuit 118 maintains current $I_{gm}$ during the low voltage portions of the CK signal duty cycle such that output current $I_S(t)$ of track and hold circuit 118 is maintained substantially the same as $I_{gm}$ during the low voltage portion of the CK signal. Track and hold circuit 118 is implemented using a switched current mirror of the type which maintains the output current even after the input current has changed. Alternatively, a voltage type sample and hold (S/H) circuit can be used. Output current $I_S(t)$ from circuit 118 is provided to comparator 106 at input 120, and to reference current generator 104 at input 122. Thus, current $I_S(t)$ is mirrored such that it can be provided at two track and hold circuit outputs. Operation of current generator 102 is discussed and shown in further detail with reference to FIGS. 5 and 6. However, for ease of illustration, only generation of one $I_S(t)$ output current is shown in FIGS. 5 and 6.

Reference current generator 104 generates a reference current $I_{REF}$ which is provided to edge triggered comparator 106 for comparison to current $I_S(t)$. With current $I_C$ appropriately adjusted, reference current generator 104 generates a substantially constant reference current for any given set of encoded input signal frequencies, and automatically adjusts the reference current appropriately if $I_S(t)$ varies slightly due to process or temperature. Reference current generator 104 includes current delay cell 124, switch $S_2$, multiplier circuit 128 and multiplier circuit 129. Current delay cell 124 can be a switched current mirror or other well known circuits which receive as an input current $I_S(t)$, which maintain that input current for a period of time $\tau$, and then provide at a later time substantially the same current as $I_S(t-\tau)$. Thus, current delay cell 124 provides at its output 126 a current approximately equal to current $I_S(t)$ from the previous cycle of the incoming encoded data signal CK. Generally, $\tau$ will have one of two values depending upon the sequence of data states received by decoder 100. When the previous and current bits each represent logical "0" data states, $\tau$ will be approximately equal to $T_0$. When the previous and current bits each represent logical "1" data states, $\tau$ will be approximately equal to $T_1$. When the previous and current bits represent a transition from a logical "1" data state to a logical "0" data state, or vice versa, $\tau$ will be approximately equal to $\frac{1}{2}*(T_0+T_1)$.

Depending upon output Q(t) of decoder 100 (discussed below in greater detail), switch $S_2$ couples output 126 of current delay cell 124 to one of multiplier circuits 128 and 129. If selected, multiplier circuit 128 multiplies current $I_S(t-\tau)$ by 0.75, while multiplier circuit 129 multiplies current $I_S(t-\tau)$ by 1.5. Other multiplication factors can be used if frequencies other than 900 KHz and 1.8 MHz are used to encode the data in the high accuracy mode of operation, for example. Large variations in $I_S(t)$, as would occur when switching between the high accuracy and low power frequency ranges, are prevented or accommodated by controlling current $I_C$ in order to change the integration rate of the super linear integrator. Generally, $I_C$ is controlled so that current $I_S(t)$ is nominally always at about the same value.

The minimum value $I_{SMIN}$ of current $I_S(t)$ provided from current generator 102 (corresponding to period $T_0$ and therefore to a logical "0" or first data state) is preferably set to approximately one half of the maximum current value $I_{SMAX}$ of current $I_S(t)$ (corresponding to period $T_1$ and therefore to a logical "1" or second data state). Therefore, reference current $I_{REF}$ at output 130 of reference current generator 104 will be substantially constant as shown in equation 1:

$$I_{REF}(\text{for all } t)=1.5*I_{SMIN}=0.75*I_{SMAX} \qquad \text{Eq. 1}$$

Because comparator 106 is edge triggered, output Q(t) will correspond to the previous encoded bit until the comparator again latches. Therefore, with current delay cell 124 also providing current $I_S(t-\tau)$ corresponding to the previous decoded bit, switch 52 is controlled such that the correct multiplication circuit is chosen to provide reference current $I_{REF}$. One advantage of decoder circuit 100 is that current $I_C$ can be controlled so that current generator 104 provides an appropriate reference current regardless of the particular set of periods (and therefore regardless of the possible values of $I_{SMIN}$ and $I_{SMAX}$) chosen to represent the logic levels in the data stream. The reference current $I_{REF}$ is maintained during slight variations in $I_S(t)$, caused by temperature or process variations, by the appropriate selection of multipliers 128 and 129. This provides advantages in that, with little or no circuit modification, decoder circuit 100 can be used to decode signals encoded with any of a wide range of sets of periods. This adaptability, along with $I_C$ modification, allows the periods to be selected or changed as may be convenient or necessary without modifying circuit 100. The ability to tailor the signal periods without modifying the circuitry saves time and costs. The use of multiplication circuits 128 and 129 allows an adequate reference current to be generated when small variations in the incoming data or clock signal CK occur.

Current comparator 106 receives current $I_S(t)$ from output 120 of current generator 102 at one of its inputs. Current comparator 106 receives at its other input reference current $I_{REF}$ from output 130 of reference current generator 104. At output 132, comparator 106 provides a high or low voltage output, depending upon whether current $I_S(t)$ is greater or lesser than reference current $I_{REF}$. Thus, comparator output 132 is indicative of whether a particular bit of the encoded signal received at switch $S_1$ contained an encoded "1" or a "0".

The output voltage signal at output 132 of comparator 106 is provided to output circuitry 108. It must be noted that, while comparator 106 is preferably a current comparator, all or parts of decoder circuit 100 can be implemented using voltage mode circuits instead of current mode circuits. For example, current generator 102 can be replaced by a voltage generating circuit. Likewise, reference current generator 104 could be replaced with a reference voltage generator circuit. In this case, comparator 106 would be replaced with a voltage comparator circuit. However, due to the noise immunity and reduced power requirements of current mode circuits, current-mode circuits such as those illustrated in FIG. 3 are preferred.

Output circuit 108 includes current source $I_V$, capacitor $C_V$, AND gate 136, and latch circuitry 140. Current source $I_V$ is coupled between supply voltage $V_{DD}$ and input 134 to AND gate 136. Input 134 to AND gate 136 is also coupled through capacitor $C_V$ to supply voltage $V_{SS}$. Output 132 of comparator 106 is coupled to input 135 to AND gate 136. Output signal Q(t) of AND gate 136 is provided at input 138 to latch circuitry 140. Latch circuitry 140 provides an output at 142 which is representative of the state of the data stream encoded in signal CK. Current source $I_V$ and capacitor $C_V$ cooperate to maintain input 134 of AND gate 136 at a low logic level voltage immediately after a reset or at start-up. Thus, output Q(t) is held low for several cycles after start-up until capacitor $C_V$ sufficiently charges. This prevents false outputs due to noise or other power-up process conditions. In the alternative, instead of using the delay circuit formed by current source $I_V$ and capacitor $C_V$, a power on reset circuit can be used to drive input node 134 of AND gate 136.

After capacitor $C_V$ is sufficiently charged, output Q(t) will reflect the state of the output of comparator 106. Latch circuitry 140 receives AND gate output Q(t) as an input and provides an output at output 142. Latch 140 is used to latch the individual decoded bits, corresponding to the encoded bits received in the serial data stream CK, to other circuitry in the transmitter.

Figure 4:
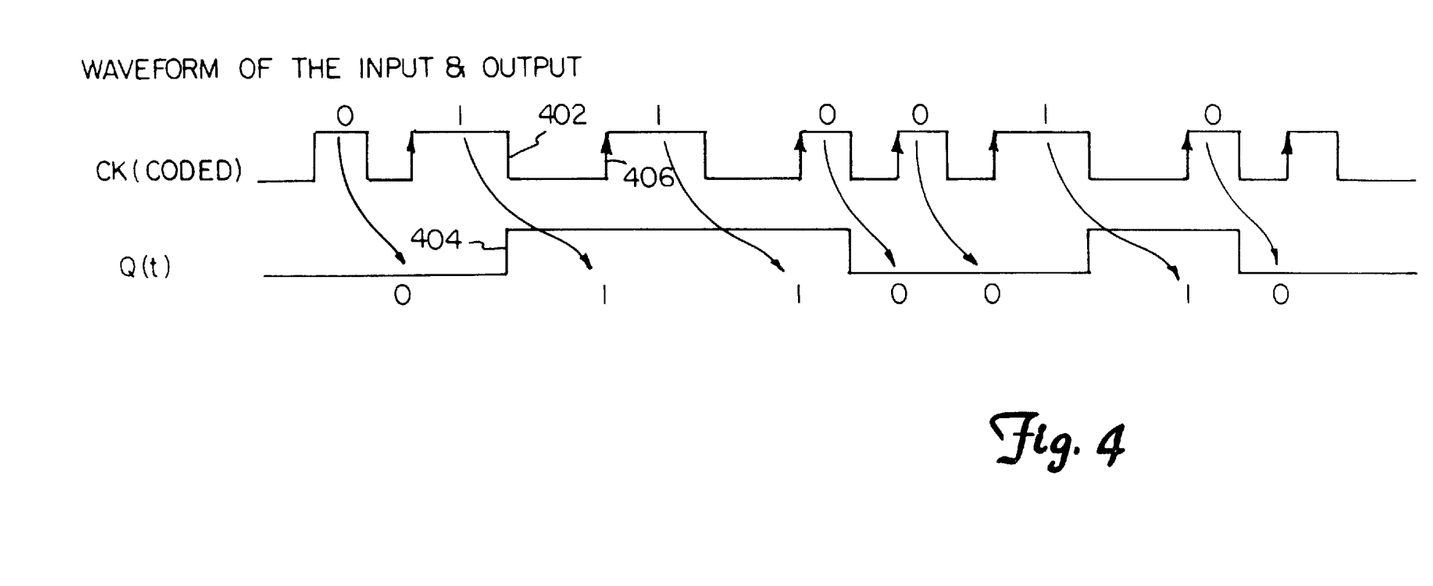
FIG. 4 is a timing diagram for the circuit of FIG. 3 and preferred methods of serial communication according to the present invention.

FIG. 4 is a timing diagram which illustrates output Q(t) as a function of input signal CK. FIG. 4 illustrates the decoded bit (in signal Q(t)) for each bit or cycle of the period encoded data signal CK. Output Q(t) changes to its corresponding value for each bit of encoded signal CK at midpoint (or falling edge 402) of the corresponding received period encoded bit. Thus, during a transition from a received period encoded "0" to a received period encoded "1", Q(t) transitions (at rising edge 404) from a "0" to "1" at midpoint (i.e. falling edge 402) of the received period encoded "1" bit. While in the preferred implementation of the present invention Q(t) transitions at the falling edges of the corresponding bit of the received period encoded signal, numerous other implementations are possible. For example, Q(t) can be designed to transition at the start (rising edge 406) of the next encoded bit received.

FIG. 5 is a circuit diagram which illustrates current generator 102 in greater detail. As shown in FIG. 5, current generator 102 is divided functionally into super-linear integration circuit 502 and track and hold circuit 118. Integration circuit 502 includes switch $S_1$, capacitor $C_1$, current source $I_C$ and transconductance amplifier 110. As shown in FIG. 5, transconductance amplifier 110 includes transistors $Q_{MN1}$ and $Q_{MN2}$ and current source $I_D$, configured as a differential amplifier. Transconductance amplifier 110 cooperates with switch $S_1$, capacitor $C_1$ and current source $I_C$ to form a super-linear integration circuit which provides an output current $I_{gm}$ having a magnitude which is dependent upon the period length of the cycle of the encoded input signal CK. Current source $I_1$ is included to provide a low level current in order to keep transistor $Q_{MN2}$ turned on. Track and hold circuit 118 includes transistors $Q_{MP1}$ and $Q_{MP2}$, capacitor $C_2$, and reset switch $S_3$. Transistors $Q_{MP1}$, transistor $Q_{MP2}$, capacitor $C_2$ and switch $S_3$ are configured as a switched current mirror.

Current generator 102 functions generally as follows. During the high voltage portion of each encoded cycle or bit of signal CK, switch $S_1$ is opened. During this time, capacitor $C_1$ charges and voltage $V_1$ drops. Thus, with the control node of transistor $Q_{MN2}$ coupled to voltage source $V_{DD}$, a voltage differential develops between the control nodes of transistors $Q_{MN1}$ and $Q_{MN2}$, causing a greater portion of current $I_D$ to pass through transistor $Q_{MN2}$. Since turn-on current $I_1$ is very small as compared to current $I_D$, the current flowing through transistor $Q_{MN2}$ will be close in magnitude to that of current $I_{gm}$ which flows into transistor $Q_{MP1}$ of track and hold circuit 118.

In general, switch $S_3$ is closed when switch $S_1$ is open and vice versa. As illustrated, both switches $S_1$ and $S_3$ are PMOS type switches. However, other switch types can be used with slight modifications. In the embodiment shown, during the high voltage portion of input signal CK, switch $S_3$ closes, and track and hold circuit 118 operates as a current mirror. Thus current $I_S$ flowing through transistor $Q_{MP2}$ will be approximately equal to current $I_{gm}$. During the low voltage portion of each cycle or bit of signal CK, switch $S_3$ opens and the charge on capacitor $C_2$ keeps transistor $Q_{MP2}$ conducting so that output current $I_S$ is maintained, even as current $I_{gm}$ changes. Thus, this switched current mirror design maintains the current generated by transconductance stage 110 for use during the next half cycle. Switched current mirrors of the type used for track and hold device 118 can also be used as current delay cell 124.

FIG. 6 illustrates the correspondence between current $I_S$ from current generator 102 and the incoming encoded signal CK. As can be seen in FIG. 6, after falling edge 605 of first cycle 602 (having period $T_0$ corresponding to a "0" bit) is received in the encoded signal CK, current $I_S$ takes on its minimum active current value $I_{SMIN}$. At rising edge 606 of next cycle 604 (having period $T_1$ corresponding to "1" bit)

of signal CK, $I_S$ drops to substantially zero. At falling edge 607 of cycle 604, current $I_S$ takes on its maximum value $I_{SMAX}$. This continues for each bit or cycle of incoming data signal CK, with current $I_S$ taking on either value $I_{SMIN}$ or value $I_{SMAX}$. Track and hold circuit 118 maintains the current value (either at $I_{SMIN}$ or at $I_{SMAX}$) for the remainder of the cycle of the encoded bit. After the rising edge of the next encoded bit, switch $S_3$ causes current $I_S$ to reset to 0.

FIG. 7 illustrates one preferred embodiment of modulator 30 used in accordance with the present invention to frequency or period encode signals for transmission across isolator 20. Modulator 30 includes a clock signal CLOCK having approximately a 50 percent duty cycle, frequency divider 702 and multiplexer 706. The 50 percent duty cycle clock signal CLOCK can have, for example, the frequency $F_0$ corresponding to transmission of a logical 0 bit. This clock signal is provided both to input 703 of frequency divider 702 and input 708 of multiplexer 706. After frequency division by divider 702, a signal having a 50 percent duty cycle but approximately one-half the frequency of clock signal CLOCK (i.e., having frequency $F_1$) is provided to multiplexer 706 at input 704. Using the control signal input 710 of multiplexer 706, output 712 of multiplexer 706 is selectively connected to the appropriate one of inputs 704 and 708 during each individual cycle. In this manner, a frequency encoded signal having a duty cycle of approximately 50 percent can be generated at output 712.

The present invention provides numerous advantages over the prior art. For example, the use of a super linear integration circuit helps to increase the integrated signal difference between encoded bits of the first and second data states. This in turn provides greater noise immunity and reduces the likelihood that transmission errors will occur. Also, preferred embodiments of the present invention require only a single integration circuit. The single integration channel nature of the decoder of the present invention reduces complexity and costs as compared to prior art two integration channel decoders. Further, use of a fifty percent duty cycle signal to encode the transmitted data reduces heat generation, reduces data losses and errors caused by distorted signals from saturated barrier transformers, and decreases interference with nearby components which can sometimes result from harmonics in non-fifty percent duty cycle signals. Additionally, fifty percent duty cycle signals decrease the decoder circuit complexity and increase the ease at which the encoded signal is generated.

The methods and circuits of the present invention can be implemented using various hardware, software and hardware/software combinations to encode and decode the data signals in order to transmit and receive messages. The present invention is particularly well adapted for use in process control transmitters, valve controllers, and in process control field devices in general because of the low current consumption of the present invention. As used herein, the term process control instrument is intended to mean any of these and other process control devices. However, the present invention can be utilized in any of a wide variety of applications in which devices on a printed circuit board or coupled to a data line in general are required to communicate with each other.

While the present invention is described primarily with respect to encoding and decoding logical ones and zeros, the present invention can also be used to implement multi-state communications in which more than two data states are encoded. The single super linear integration circuit and other decoding circuitry can be used to decode either pulse width modulated or frequency modulated signals with little or no modification. Terms such as decoding circuitry, integration circuitry and current generator circuitry can all be used to refer to transition detecting circuitry of the type which detects transitions in an encoded signal for purposes of decoding the signal.

Although the present invention has been described with reference to preferred embodiments, workers skilled in the art will recognize that changes may be made in form and detail without departing from the spirit and scope of the invention.

What is claimed is:

1. A decoding circuit for decoding a frequency encoded signal into at least two data states, the circuit comprising:

a super linear integrator which integrates the signal over one-half of a period of the signal to provide an integrated value at the end of the half period, wherein the super linear integrator has a response as a function of time (t) of $y=mt^x$, where x is a number having a value greater than one and m is a constant;

a reference value generator; and a comparator coupled to the integrator and to the reference value generator, the comparator comparing the integreated value to the reference value during the other half of the period and providing in response an output indicative of the data state.

2. The decoding circuit of claim 1, wherein the reference value generator comprises a multiplier coupled to the integrator and selectively controlled by a switch, the multiplier generating a reference value by selectively multiplying a preceding integrated value by a factor either greater than or less than one as a function of a preceding data state associated with the preceding integrated value.

3. The decoding circuit of claim 2, wherein the integrator comprises a transconductance amplifier which provides the integrated value at a transconductance amplifier output.

4. The decoding circuit of claim 3, further comprising a track and hold device coupled between the output of the transconductance amplifier and the comparator and between the output of the transconductance amplifier and the multiplier, the track and hold device receiving the integrated value and maintaining the integrated value during the other half of the period.

5. The decoding circuit of claim 4, further comprising a current delay cell coupled between the track and hold device and the multiplier, the current delay cell receiving and storing the integrated value during the other half of the period and providing to the multiplier the preceding integrated value during the other half of the period.

6. The decoding circuit of claim 5, wherein the integrator, the transconductance amplifier, the track and hold device, the current delay cell and the comparator are MOS devices.

7. The decoding circuit of claim 2, wherein the switch is controlled such that the multiplier selectively multiplies the preceding integrated value by a factor of either approximately 1.5 or approximately 0.75 as a function of the preceding data state associated with the preceding integrated value.

8. The decoding circuit of claim 2, wherein the preceding integrated value is equal to one of a maximum integrated value or a minimum integrated value, wherein the factor greater than one and the factor less than one are selected such that the factor greater than one multiplied by the minimum integrated value is approximately equal to the factor less than one multiplied by the maximum integrated value.

9. A process control instrument comprising:

sensor circuitry positioned in a first housing;

measurement circuitry positioned in a second housing and coupled to a process control loop, the measurement circuitry transmitting data related to a process over the process control loop; and a transmission line including an isolation barrier and carrying an encoded signal between the sensor circuitry and the measurement circuitry, wherein a cycle of the encoded signal having a first period is indicative of a first data state bit, and a cycle of the encoded signal having a second period different than the first period is indicative of a second data state bit;

wherein the sensor circuitry further includes decoding circuitry, the decoding circuitry comprising:

transition detecting circuitry coupled to the transmission line detecting a first transition of the encoded signal during a first cycle and responsively generating a detection signal which increases or decreases from an initial detection signal value, and detecting a second transition of the encoded signal during the first cycle which follows the first transition of the encoded signal during the first cycle, wherein upon detection of the second transition the transition detecting circuitry causes the detection signal to reach a final detection signal value;

comparison circuitry coupled to the transition detecting circuit which compares the final detection signal value to a threshold value at a time subsequent to detection of the second transition; and output circuitry coupled to the comparison circuitry providing a first data bit having a first type if the final detection signal value is greater than the threshold value, and providing the first data bit having a second type if the final detection signal value is less than the threshold value.

10. The process control instrument of claim 9, wherein the encoded signal is a fifty percent duty cycle signal during both cycles having the first period and cycles having the second period.

11. The process control instrument of claim 10, wherein one of the first and second periods is substantially double the other of the first and second periods.

12. The process control instrument of claim 10, wherein the transition detecting circuitry comprises integration circuitry which receives the encoded signal as an input and which integrates the encoded signal during one half of individual cycles of the encoded signal and provides in response an integration output signal indicative of the period of the encoded signal during the individual cycles of the encoded signal.

13. The process control instrument of claim 12, wherein the integration circuitry includes super linear integration circuitry which provides the integration output signal as a function of time (t) using the relationship $y=mt^x$, where x is a number having a value greater than one and m is a constant.

14. The process control instrument of claim 12, wherein the integration circuitry provides the integration output signal in the form of a current signal, wherein the threshold value is a threshold current value, and wherein the comparison circuitry includes a current comparator circuit for comparing the integration output signal to the threshold current value.

15. A process control instrument comprising:

sensor circuitry;

measurement circuitry coupled to a process control loop, the measurement circuitry transmitting and receiving data over the process control loop and receiving power from the process control loop;

a barrier coupled between the sensor circuitry and the measurement circuitry and electrically isolating the sensor circuitry from the measurement circuitry;

wherein one of the sensor circuitry and the measurement circuitry further comprises encoding circuitry coupled to the barrier, wherein the encoding circuitry encodes data in a fifty percent duty cycle signal transmitted across the barrier, wherein a cycle of the fifty percent duty cycle signal having a first period is indicative of transmission of a first data state bit, and wherein a cycle of the fifty percent duty cycle signal having a second period different than the first period is indicative of transmission of a second data state bit; and wherein the other of the sensor circuitry and the measurement circuitry includes decoding circuitry coupled to the barrier, the decoding circuitry receiving the fifty percent duty cycle signal across the barrier and extracting the data from the fifty percent duty cycle signal.

16. The process control instrument of claim 15, wherein one of the first and second periods is substantially double the other of the first and second periods.

17. The process control instrument of claim 15, wherein the decoding circuitry comprises:

integration circuitry which receives the fifty percent duty cycle signal as an input and which integrates the fifty percent duty cycle signal during individual cycles of the fifty percent duty cycle signal and provides in response an integration output signal indicative of the period of the fifty percent duty cycle signal during the individual cycles of the fifty percent duty cycle signal;

reference signal generation circuitry generating a reference signal; and comparator circuitry which receives the integration output signal and the reference signal as inputs and provides a comparator output signal in response, wherein the comparator output signal associated with each cycle of the fifty percent duty cycle signal is indicative of the data state represented by the cycle of the fifty percent duty cycle signal.

18. The process control instrument of claim 17, wherein the integration circuitry includes super-linear integration circuitry which provides the integration output signal as a super-linear function of the fifty percent duty cycle signal.

19. The process control instrument of claim 17, wherein the integration circuitry provides the integration output signal in the form of a current signal, wherein the reference signal generation circuitry generates the reference signal in the form of a current signal, and wherein the comparator circuitry includes current comparator circuitry.

20. The process control instrument of claim 15, wherein the barrier includes a transformer.

21. A method of decoding an encoded signal, the method comprising:

receiving a first bit of the encoded signal;

integrating the first bit of the encoded signal with a super linear integrator to provide a first integration signal associated with the first bit of the encoded signal;

providing a first reference signal as a function of a previous value of the first integration signal associated with the previous bit of the encoded signal by multiplying the previous value of the first integration signal by an amount greater than one if the previous bit had a first value, and by multiplying the previous value of the first integration signal by an amount less than one if the previous bit had a second value; and comparing the first integration signal to the first reference signal and providing a first bit of an output signal based upon the comparison, wherein the first bit of the output signal is indicative of information encoded in the first bit of the encoded signal.

* * * * *

UNITED STATES PATENT AND TRADEMARK OFFICE
CERTIFICATE OF CORRECTION

PATENT NO. : 6,021,162
DATED : February 1, 2000
INVENTOR(S) : Michael Gaboury et al.

It is certified that error appears in the above-identified patent and that said Letters Patent is hereby corrected as shown below:

Title page, item

[56] under    References Cited

U.S. Patent Documents     --4,021,744  5/1977  Montefusco  329/105--.

--5,550,505  8/1996  Gaus, Jr.  329/300--.

Signed and Sealed this

Thirteenth Day of March, 2001

Attest:

NICHOLAS P. GODICI

*Attesting Officer*    *Acting Director of the United States Patent and Trademark Office*